United States Patent [19]

Gordon

[11] Patent Number: 4,816,352

[45] Date of Patent: Mar. 28, 1989

[54] ELECTROCHEMICAL CELL AQUEOUS ELECTROLYTE AND METHOD

[76] Inventor: Arnold Z. Gordon, c/o Gould Defense Systems Inc., Ocean Systems Division, 18901 Euclid Ave., Cleveland, Ohio 44117

[21] Appl. No.: 622,785

[22] Filed: Jun. 21, 1984

[51] Int. Cl.$^4$ ............................................. H01M 6/04
[52] U.S. Cl. ...................................... 429/13; 429/27; 429/50; 429/46; 429/206; 429/120
[58] Field of Search ....................... 429/13, 26, 27, 29, 429/50, 46, 120, 188, 206, 218

[56] References Cited

U.S. PATENT DOCUMENTS

| | | | |
|---|---|---|---|
| 3,791,871 | 2/1974 | Rowley | 429/118 |
| 3,976,509 | 8/1976 | Tsai et al. | 429/194 |
| 4,001,043 | 1/1977 | Momyer | 429/206 |
| 4,007,057 | 2/1977 | Littauer et al. | 429/57 |

Primary Examiner—Anthony Skapars
Attorney, Agent, or Firm—Dick and Harris

[57] ABSTRACT

An electrochemical cell and a method of controllably generating electricity with the cell wherein the cell comprises an anode of a metal which is highly reactive with water, a cathode of a nonreactive, electrically conductive material spaced from the anode, and an electrolyte which is an aqueous solution of a negatively charged electrolytic ionic specie and which is saturated with respect to the electrochemical reaction product between the anodic metal and the electrolytic ionic specie.

The cell advantageously operates at elevated temperatures, is stable and safe, generates high current densities, provides a readily manageable electrolyte system and is controllable by control of the operating temperature alone.

80 Claims, 3 Drawing Sheets

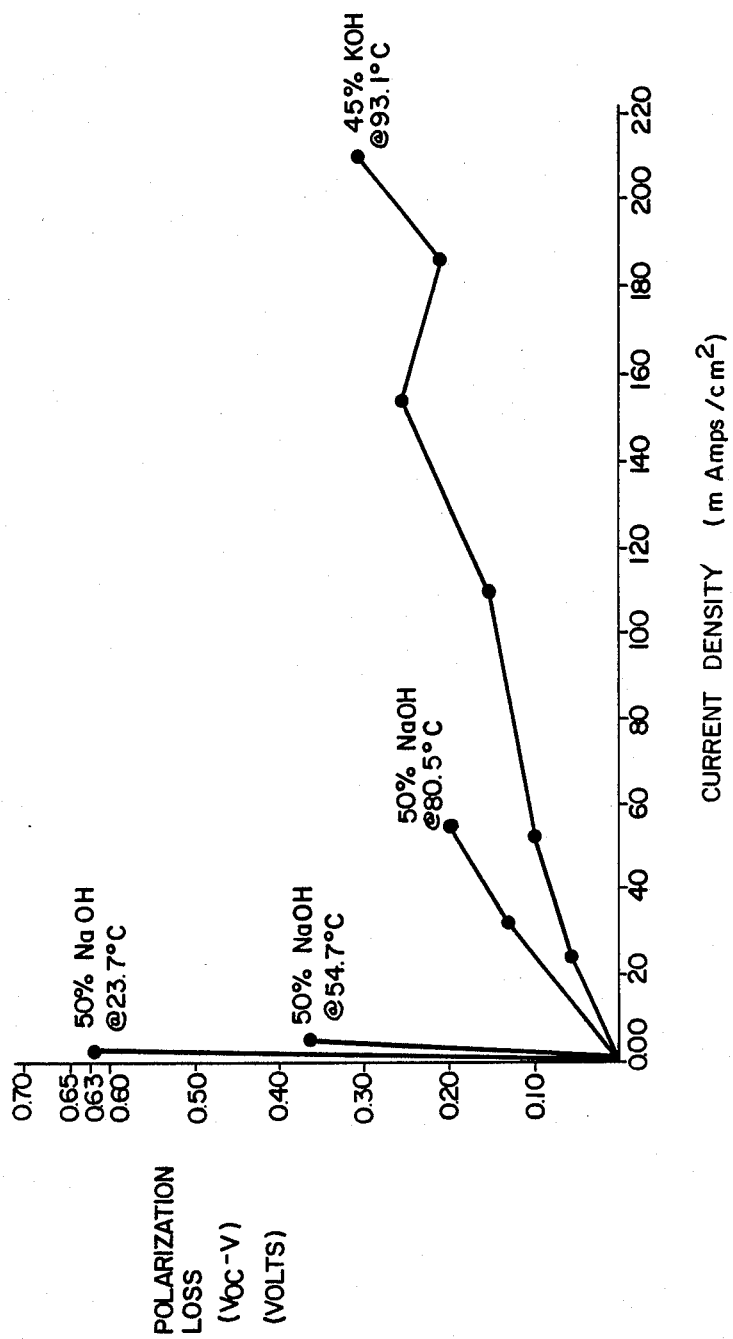

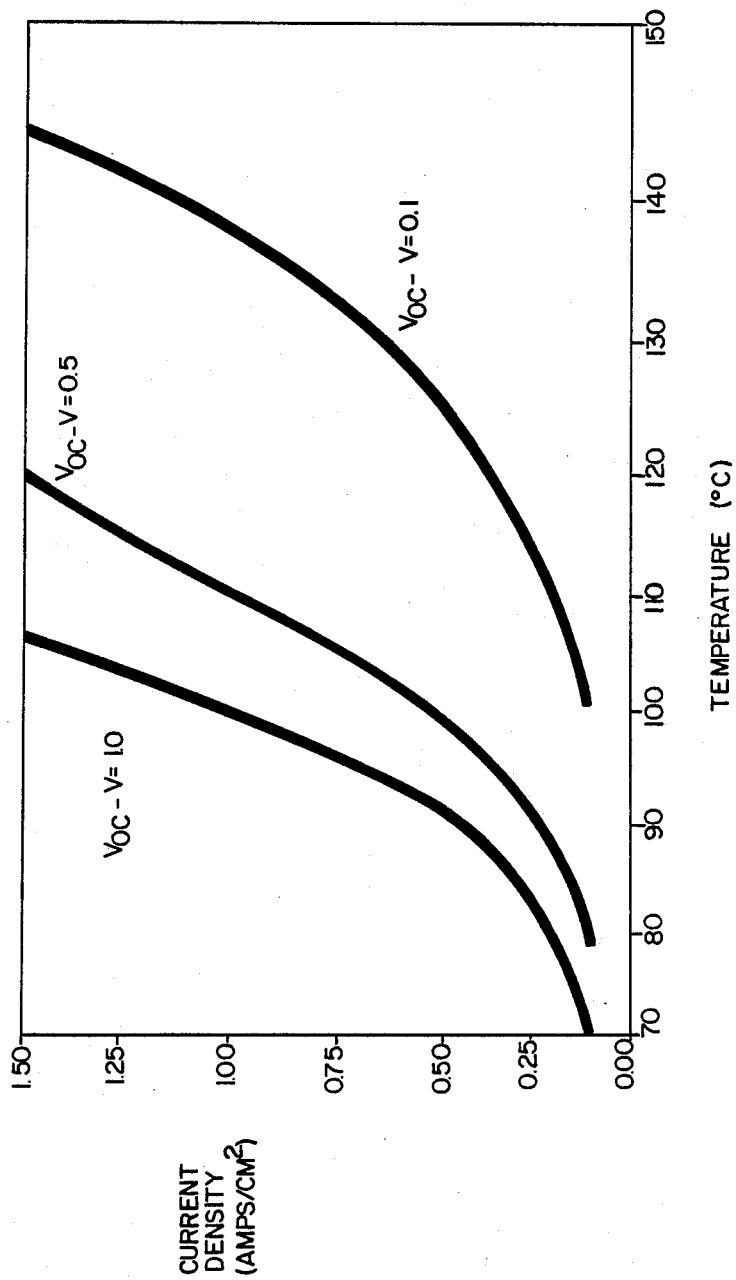

4,816,352

ELECTROCHEMICAL CELL AQUEOUS ELECTROLYTE AND METHOD

BACKGROUND OF THE INVENTION

1. Field of the Invention

This invention relates generally to electrochemical cells and methods of generating electricity using such cells and, more particularly, this invention relates to an electrochemical cell utilizing an alkaline metal or other reactive metal anode and an aqueous electrolyte.

2. Description of the Prior Art

Electrochemical cells utilizing a reactive metal anode, a nonreactive, electrically conductive cathode and an aqueous electrolyte are well known. Such cells are described in, for example, Rowley U.S. Pat. No. 3,791,871 (Feb. 12, 1974), Tsai et al U.S. Pat. No. 3,976,509 (Aug. 24, 1976) and Littauer et al U.S. Pat. No. 4,007,057 (Feb. 8, 1977), all of which are assigned to Lockheed Missiles & Space Company, Inc., Sunnyvale, Calif. or Lockheed Aircraft Corporation, Burbank, Calif. The respective disclosures of the above-identified patents are hereby incorporated herein by reference.

The cell disclosed in Rowley U.S. Pat. No. 3,791,871 typifies prior electrochemical cells utilizing a reactive metal anode and an aqueous electrolyte. In the cell of the Rowley patent, the anode comprises an elemental alkali metal such as sodium or lithium, and the electrolyte comprises an aqueous solution of sodium hydroxide or lithium hydroxide, respectively, produced by the electrochemical reaction of the anodic metal and water.

The anode of the Rowley patent is coated with a thin film of nonreactive, water soluble material which is not electrically conductive. Preferably, the film is the natural hydrated oxide which forms on the metal surface as it is exposed to humid air. However, other suitable water soluble insulators may be used for the film. The film is porous and allows transport of aqueous electrolyte to the anode and transport of reaction products away from the anode.

A cathode comprising a nonreactive, electrically conductive metal is spaced from the anode.

The electrolyte of the cell disclosed in the Rowley patent is formed by the electrochemical reaction of water and the anodic metal. Thus, in the Rowley cell, water is introduced to the cell at a restricted rate and brought into direct contact with both the cathode and the anode. The water dissolves at least a portion of the soluble film on the anode, resulting in the production of a hydrated hydroxide of the anode metal, plus heat. As the reaction proceeds, useful electrical power is produced.

The anode and the cathode are not in direct metallic contact, but circuit connections are made at each of the cathode and anode for drawing electrical power from the cell.

The alkali metal of the anode is highly reactive with water. This reactivity decreases as the concentration of metal hydroxide in the electrolyte increases. Thus, prior electrochemical cells of the Rowley type operate at electrolyte concentrations of the anode reaction product (e.g. NaOH or LiOH) well below saturation. For example, such cells usually operated at a maximum of about 60–80% of saturation, due to the tendency of alkali metals to passivate at higher electrolyte anodic metal hydroxide concentrations.

Additionally, prior alkali metal cells of the Rowley type (i.e. with unsaturated aqueous electrolytes) typically operate at relatively low temperatures of about 25–35° C. (with an absolute maximum of about 50° C. for elemental lithium anodes) due to the characteristic tendency of such cells to exhibit thermal runaway and, ultimately, to explode when operated at higher temperatures.

Thus, one major disadvantage of prior alkali metal/aqueous cells is the inability to operate at elevated temperatures due to the metastable control characteristics of such cells. In many environments, such as in aircraft, submarine or torpedo applications, where the ambient temperature is only slightly lower than the cell operation temperature, large, heavy heat exchange equipment is required in order to maintain the temperature at a constant level.

Additionally, such inherently unstable cells create complicated control problems and are inherently unsafe.

Since relatively high sodium hydroxide or lithium hydroxide concentrations must be avoided in prior cells to maintain a desired level of power output at operation temperatures, any excess aqueous lithium or sodium hydroxide must be removed, requiring inconvenient precipitants or ion exchange equipment. Also, since electrolyte concentration gradients are inherently present in such cells, the anodes tend to wear unevenly, resulting in inconvenient evolution of hydrogen gas and non-uniform voltages.

SUMMARY OF THE INVENTION

It is an object of the invention to overcome one or more of the problems described above.

According to the present invention, a stable electrochemical cell comprises a reactive metal anode, a nonreactive, electrically conductive cathode spaced from the anode, and an aqueous electrolyte comprising a solution of a negatively charged electrolytic ionic specie and which is saturated with respect to the electrochemical reaction product of the anodic metal and the ionic specie. The cell is operated at a selected elevated temperature to provide a desired rate of electrical power generation.

The present invention also comprehends a method of generating electrical power utilizing the cell, and a method of controlling the rate of power generation of the cell.

The inventive cell is extremely stable and is readily controllable by means of temperature control alone, can operate at temperatures as high as the boiling point of the electrolyte at the pressure of operation, thus minimizing the volume and weight of required heat exchange equipment, is extremely safe and provides a highly simplified electrolyte management system.

Other objects and advantages of the invention will be apparent to those skilled in the art from the following detailed description, taken in conjunction with the Figures and the appended claims.

BRIEF DESCRIPTION OF THE FIGURES

FIG. 2 is a plot of experimentally observed polarization losses vs. current density obtained with an exemplary cell made of the invention using two different electrolytes at four different temperatures; and, FIG. 3 is a plot of calculated current density vs. temperature using polarization loss as a parameter according to cells made according to the invention.

DETAILED DESCRIPTION OF THE INVENTION

Figure 1:
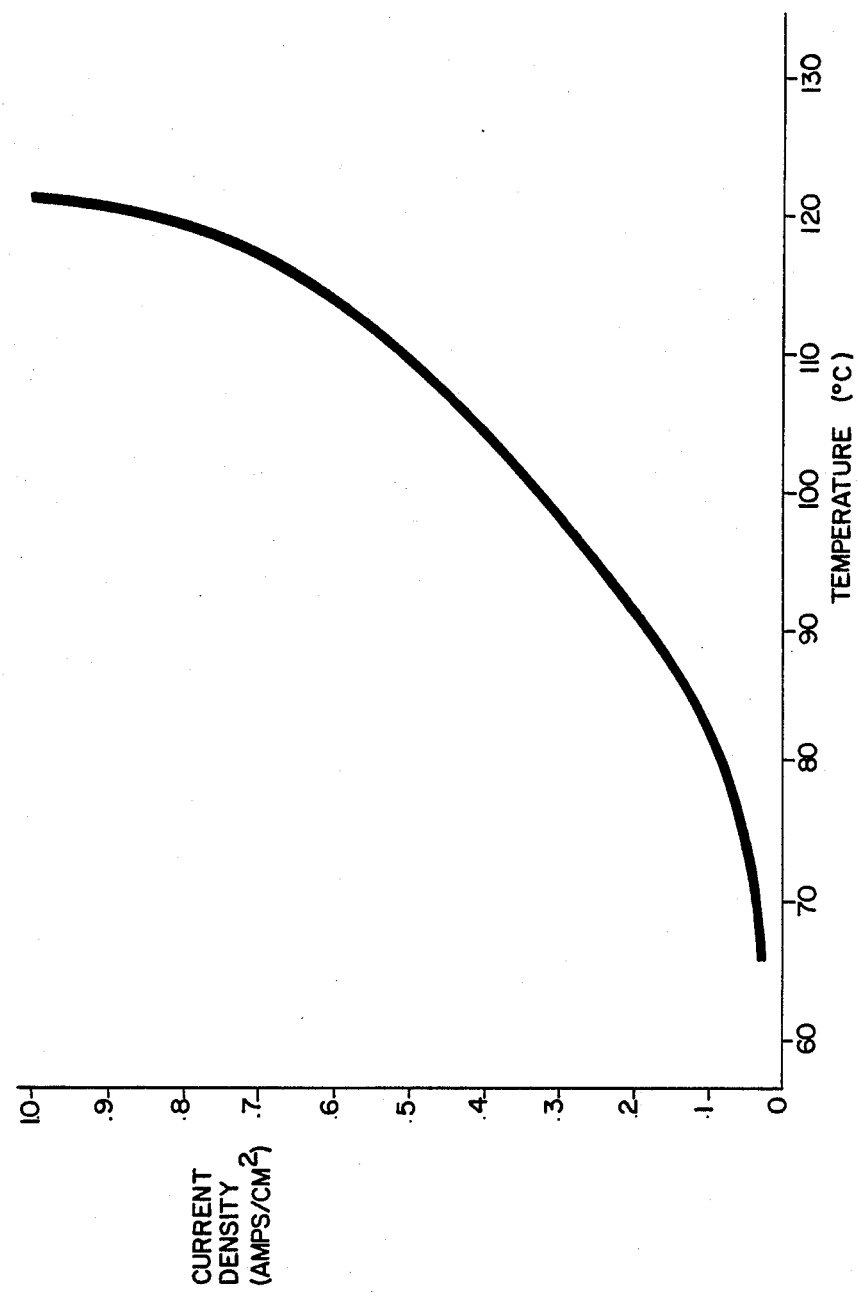
FIG. 1 is a plot of experimentally observed current density vs. electrolyte temperature obtained with an exemplary cell of the invention at constant voltage.

Generally stated, the invention comprehends an electrochemical cell comprising an anode of a metal which is highly reactive with water, a nonreactive, electrically conductive cathode spaced from the anode, and an electrolyte comprising an aqueous solution containing a negatively charged electrolytic ionic specie and saturated with respect to the water soluble electrochemical reaction product of the anodic metal and the ionic specie. The cell is operated at an elevated electrolyte temperature which is sufficiently high to result in the production of useful electrical power. The cathode and the anode are each at least partially immersed in the electrolyte.

The cell is capable of operation at a temperature up to the boiling point of the electrolyte at the pressure of operation, and produces current at a rate which is generally exponentially related to the temperature. The cell is extremely safe and stable, can operate at a very high temperature, thus minimizing the required weight and volume of heat exchange equipment, is readily controllable, provides very high current densities and allows very simple electrolyte management. Simple filtration equipment suffices to remove any excess solids from the electrolyte.

The various components of the cell, operation conditions and procedures, and other advantages are set forth in more detail below.

The Anode

According to the invention, the anode comprises a metal which is highly reactive with water. Specifically, the anode comprises an alkali metal such as sodium, lithium, potassium, etc. Lithium is the preferred anodic metal.

The anode may comprise the metal in elemental form, or it may comprise a compound, alloy or amalgam of the metal. It is preferred to use the metal in a low density form. Thus, if the anode is an alloy or amalgam of the metal, it is preferred that the alkaline metal be combined with a relatively low density metal. However, heavy metals such as lead may be used if the proportion of the heavy metal in the alloy or amalgam is low.

The form of the anode is not critical, and any suitable configuration which is convenient for a desired application may be used.

Since the alkali metals spontaneously form hydroxide films upon contact with humid air, the surfaces of the anode will typically be coated with a water soluble film of hydrated metal hydroxide. This film is porous and thus allows transport of electrolyte to the anode surface and transport of reaction products away from the anode surface.

The Cathode

The cathode of the invention is spaced from the anode without direct metal-to-metal contact therewith, and comprises any suitable nonreactive, electrically conductive material, including prior known cathodic metals or a gas diffusion electrode, such as an air cathode. In certain applications, an air cathode is preferred but in others a simple metal cathode such as stainless steel, etc. is suitable.

The configuration of the anode and cathode is not critical as long as direct metal-to-metal contact between the anode and cathode is avoided. In most cases, the cathode will be spaced from the anode by means of the soluble hydroxide or other film on the anode, with or without a solid porous separator between the anode and cathode. Such separators are well known in the art, and are disclosed in Rowley U.S. Pat. No. 3,791,871, for example.

Of course, each of the anode and the cathode will include a terminal or other circuit connection means for drawing electrical power from the cell. Such circuit connection means are well known in the art.

The Electrolyte

As stated generally above, the electrolyte comprises an aqueous solution of a negatively charged, electrolytic ionic specie or species, and is substantially saturated with respect to the soluble electrochemical reaction product of the anodic metal and the ionic specie. As set forth in more detail below, the electrolyte can contain any of various inorganic and organic additives, and may, in many instances, conveniently contain water soluble additives providing a common ion effect with respect to the soluble anode reaction product.

The water of the electrolyte may be fresh water or seawater, or, if desired, may comprise distilled or deionized water. However, the source of the water is not critical in the invention.

The negatively charged ionic specie is selected to provide acceptable conductivity of the electrolyte, and the identity of the ionic specie is not critical. For example, the ionic specie may be hydroxide, halide (such as fluoride, for example), phosphate or carbonate. Hydroxide is the preferred ionic specie due to its ease of handling and ready availability.

It is critical to the invention that the aqueous electrolyte be saturated with respect to the electrochemical reaction product between the anodic metal and the ionic specie. This reaction product is formed between the positively charged anodic metal (which charging is the result of the reaction between the metal and water) and the ionic specie. As is well known in the art, this reaction produces an ionized salt dissolved in water. However, upon saturation, excess salt precipitates as a solid.

For example, where the anodic metal is lithium (Li) reaction of the anode with water produces charged lithium ions according to the following equation:

$$Li(s) \rightarrow Li^+ + e^- \qquad (1)$$

where the concentration of $Li^+$ is variable. Where allowed to proceed to saturation, the following reaction is applicable:

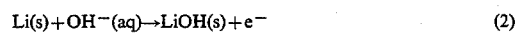

$$Li(s) + OH^-(aq) \rightarrow LiOH(s) + e^- \qquad (2)$$

where the concentration of LiOH is fixed.

Thus, in the case of a lithium anode, the invention requires that the electrolyte be saturated with respect to the water soluble reaction product of lithium and the ionic specie. If the ionic specie is hydroxide, the electrolyte must be saturated with respect to lithium hydroxide. If the ionic specie is fluoride, for example, the electrolyte must be saturated with respect to lithium fluoride (LiF).

Saturation of the electrolyte may be effected by various means, as desired. Reaction of the anode at low temperatures (e.g. less than about 50° C. for elemental lithium) naturally proceeds to produce lithium and hydroxide ions and, if unimpeded by ion removal techniques, will proceed to saturation. Alternatively, the electrolyte may be provided to the cell in the form of a saturated solution with excess solid anode product (e.g. LiOH) present therein. Thirdly, and very conveniently, the electrolyte may include a substance which provides a common ion effect with respect to the anode reaction product to assist in the attainment of saturation at lower anodic metal ion concentrations. The use of a common ion material also improves conductivity of the electrolyte and, if used above certain concentrations, tends to provide anhydrous anode reaction product which in turn lowers the weight of the system.

For example, if the anode is lithium and the negatively charged ionic specie of the electrolyte is hydroxide, the anode reaction product is lithium hydroxide (LiOH). The saturation concentration of lithium hydroxide in distilled water is about 5.3 M, and this concentration is relatively independent of temperature. However, this concentration is not independent of the concentration of other materials in the electrolyte, and the saturation concentration decreases as the concentration of other materials rises.

Thus, the electrolyte may be provided with such common ion materials such as potassium hydroxide (KOH) or sodium hydroxide (NaOH) to shift the saturation concentration of lithium downward. This in turn renders the electrolyte much more sensitive to the addition of lithium ions to the solution and thus is very helpful in maintaining saturation of the electrolyte. The common ion effect of KOH or NaOH can be viewed as common ion suppression of solubility of lithium hydroxide. Although the saturation concentration of lithium hydroxide in distilled water is about 5.3 M, it decreases to the order of about 10 mM in a concentrated hydroxide solution.

The use of a common ion additive also improves the ionic conductivity of the electrolyte, thus allowing the use of higher voltage, and the minimization of thermal losses. Also, the use of common ion additives or other additives allows the adjustment of the melting point and boiling point of the electrolyte over very wide ranges. Thus, in the case of an aqueous lithium hydroxide electrolyte, operation is not limited to the range of 0-100° C. and, in fact, operation above 100° C. according to the invention is convenient.

One very important characteristic of the electrolyte of the invention is that the cell provides substantially identical power characteristics regardless of the nature of the aqueous electrolyte, as long as the electrolyte is saturated with respect to the anodic reaction product.

In practice, in lithium anode systems of the invention, it is highly preferred to use an aqueous electrolyte comprising, for example, about 50 weight percent of sodium hydroxide or about 45 weight percent of potassium hydroxide in addition to the saturated concentration of lithium hydroxide.

One disadvantageous characteristic of prior reactive metal/non-saturated aqueous cells is their tendency to exhibit very rapid thermal runaway and, ultimately, explosion if operated at an elevated temperature (e.g. above about 50° C. for elemental lithium). The electrolyte of the invention is in effect self-regulating in that if the anode reaction product concentration of the electrolyte falls below saturation, saturation will rapidly be restored due to the reaction of the electrolyte with the anode without adverse thermal effects.

Another advantage of the invention is that, if desired, the rate of reaction can be suddenly but temporarily increased by the simple addition to the electrolyte of pure water or water having a very low concentration of the anode reaction product, as from a reservoir outside the reaction space of the cell. This addition temporarily decreases the cell electrolyte concentration, thus resulting in a rapid increase in reaction rate and a consequent increase in current output.

The self-regulating aspect of the electrolyte concentration renders the cell virtually explosion-proof, and eliminates the need for electrolyte concentration management. In prior cells, the electrolyte concentration had to be maintained within rather narrow limits by removal of ionic species, as by precipitation (using precipitants), or by other inconvenient separation techniques such as ion exchange. The need for such inconvenient techniques is eliminated by the invention.

Since the electrolyte is saturated, it will contain at least small amounts of solid reaction product, such as solid lithium hydroxide, for example. As the cell is used, additional anode reaction product will, of course, form and precipitate. Excess precipitated solid reaction product may be removed, if desired, by simple filtration or centrifugation, or by other suitable means. Such removal is not necessary, however, but may be desirable if the proportion of solid precipitated reaction product in the electrolyte increases above convenient levels.

Thus, it will be clear to those skilled in the art that although the saturation concentration of lithium hydroxide or other anode reaction products varies with the presence of other dissolved species in the electrolyte, saturation is readily attainable regardless of the presence of other solutes in the electrolyte. One very useful feature of the invention is that the absolute concentration of the anode reaction product is not critical, and that cell performance characteristics are independent of the absolute concentration, as long as the electrolyte is saturated with respect to the reaction product.

If desired for a particular application, the electrolyte may contain any of various organic or inorganic additives, such as disclosed in Tsai et al U.S. Pat. No. 3,976,509 or Littauer et al U.S. Pat. No. 4,007,057. The presence of such additives may affect the saturation concentration of the anode reaction product, but will not affect the power characteristics of the cell as long as saturation with respect to the reaction product is maintained.

As noted above, certain anode reaction products tend to form monohydrates as they precipitate. For example, LiOH tends to precipitate as $LiOH.H_2O$. This adds to the weight of the system. It has been found that the use of common ions in the electrolyte above certain empirically determinable concentrations results in the precipitation of the anode reaction product in the anhydrous form. For example, a sodium hydroxide concentration in the electrolyte above about 8 M is effective to prevent precipitation of hydrated LiOH. The required concentration of potassium hydroxide is somewhat higher than 8 M but can be readily empirically determined. It should also be noted that operation above a certain minimum temperature independently prevents hydration of the precipitated reaction poduct. In the case of lithium hydroxide, an electrolyte temperature of above about 105° C. prevents hydration.

Temperature of Operation

Prior reactive metal/aqueous cells operated at relatively low temperatures, e.g. from about ambient to a maximum in the range of 40°–50° C. in the case of cells using elemental lithium anodes. This low temperature operation was due to the tendency of prior unsaturated electrolytes to result in uncontrollable thermal runaway and explosion if operated at above a certain maximum temperature. Operation at less than saturation concentrations in the electrolyte was mandated by the observation that reactive metal anodes passivate as electrolyte saturation is approached.

According to the invention, however, passivation of the anode is compensated for by operation of the cell at an elevated temperature which is selected to result in the production of electrical power at a desired rate. It has been found that if a saturated electrolyte is provided, a reactive metal/aqueous cell can stably and safely be operated at temperatures well in excess of prior practical maximum temperatures, and that the power characteristics of the cell are readily controllable and are directly related to the temperature of operation. More specifically, it has been found that power characteristics (i.e. current density, etc.) are directly and exponentially related to the temperature of the electrolyte, and that the temperature is the only variable which need be considered.

In one aspect, it is the passivation of the anode at electrolyte saturation which allows the invention to safely and stably produce electrical power. This is especially important in view of the fact that operation at moderate temperatures with a non-saturated electrolyte invariably results in thermal runaway and explosion of the cell.

According to the invention, operation at elevated temperatures even above the melting point of the anode is possible. The maximum useful temperature of operation appears to be limited only by the boiling point of the electrolyte at the pressure of operation. Thus, since aqueous electrolytes containing common ion additives and other additives can have atmospheric boiling points well in excess of 100° C., it is readily possible to operate the cell in the invention at temperatures such as 90° C. to at least 150° C. at atmospheric pressure using a lithium anode. If the cell is pressurized, as might be encountered in submarine torpedoes operating at great depths, even higher temperatures are obtainable.

The temperature of operation is not limited by the melting point of the anode and, in fact, the use of a molten metal anode may provide enhanced efficiencies due to the great increase in available surface area of the anodic metal.

The desired operating temperature can be attained by any of various means. The cell is self-heating at even low temperatures because the anode electrochemical reaction proceeds to some extent and creates heat as it does so. Thus, in practice, the electrolyte need only be added to the cell and the reaction allowed to proceed (at electrolyte saturation, for safety) with appropriate heat exchange means for maintenance of the cell temperature when the desired temperature is reached.

Alternatively, an external heating source for starting the cell may be provided, or the cell may be started with an electrolyte having less than the saturation concentration of anode reaction product, whereby a rapid increase in electrolyte temperature is provided, followed by addition of solid anode reaction product to effect immediate saturation or, alternatively, with the addition of a common ion additive such as KOH or NaOH to immediately reduce the saturation concentration, thus effecting saturation.

One direct advantage of the invention is the high temperature operation which was not possible with prior cells but which is very desirable in terms of heat exchange capabilities. Since cells are generally operated under ambient conditions where the temperature is in the range of 25°–40° C., or lower in many applications, and since the weight and volume of required heat exchange equipment is inversely related to the temperature difference between the system and ambient, prior cells require very large and heavy heat exchangers to maintain temperature control. According to the invention, temperature differences between the system and ambient on the order of 100° C. or more are readily obtainable, thus minimizing the required heat exchange capability. This is an especially important advantage in aircraft and submarine environments.

In view of the present disclosure, those skilled in the art will recognize that desirable high temperature operation of electrochemical cells is possible only with the saturated electrolyte of the invention, due to the tendency of saturated electrolytes to passivate the anode. The accompanying advantages of the inventive cell and method are numerous. High temperature operation with attendant minimization of the size and weight of heat exchange equipment is made possible for the first time. The entire system is readily controllable by control of only a single variable, i.e. temperature. The electrolyte management problems present in prior cells where electrolyte concentration and temperature had to be strictly controlled are eliminated and simple filtration equipment suffices to remove excess precipitated anode reaction product solids.

Also, the present invention produces less hydrogen gas than prior cells and, since the electrolyte is saturated, all parts of the metallic anode contact electrolyte of the same concentration. This eliminates uneven wear of the anode which in the past resulted in lower voltages and the production of undesirably high amounts of parasitic hydrogen gas. In cell configurations where anodes and cathodes are stacked and compressed, uneven wear of the anode complicates the engineering problem of maintaining the integrity of the anode structure.

The thermal losses experienced with the cell of the invention are minimized, thus greatly enhancing the efficiency of the cell. Thermal runaway is impossible due to the passivation of the anode, and increases in temperature merely result in increased current output. Thus, the cell is rendered virtually explosion proof.

Since the electrolyte is saturated, the cell can operate at extremely low or nonexistent electrolyte flow rates, although some minimal flow rate is generally desired in order to maintain circulation of solid precipitants present in the electrolyte. Thus, it will be clear to those skilled in the art that the electrochemical system of the invention is indifferent to pressure of operation, electrolyte flow rate, and all other variables other than temperature as long as saturation of the electrolyte is maintained.

EXAMPLES

The following detailed examples are intended to illustrate the invention, and are not to be considered as limiting in any way.

EXAMPLE 1

A simple cell made according to the invention was prepared as follows.

An uncoated circular elemental lithium disc having a cross-section of about 2.4 cm² was adhered to a stainless steel plate which was coated with a rubber electrical insulating material. The resulting anode and a stainless steel cathode (about 1 7/16"×3") were placed in a 600 cc tall Pyrex ® beaker.

About 200 cc of an electrolyte comprising an aqueous solution of 50 wt. % NaOH (about 19 M) and saturated with LiOH (solid excess LiOH was present) was added to the beaker. The resulting cell was placed on an elctrical heater/stirrer, with a one inch stir bar in the beaker with temperature measured by a thermocouple. Voltage was set at 1.00 ±0.03 volts and maintained at that value by a direct current external power supply. The temperature was varied between 66.7° C. and 121° C. with the heater. Current was measured at each temperature with an ammeter.

FIG. 1 represents a plot of the observed current density (amps per cm²) vs. electrolyte temperature. The plot of FIG. 1 is clearly exponential in form.

Little or no stirring was necessary during the experiment and little or no hydrogen evolution was observed.

The data obtained in the experiment are shown in the following table.

TABLE I

| Temperature (°C.) | Current (i) (mA) |
|---|---|
| 66.7 | 70 |
| 72 | 97 |
| 77.4 | 188 |
| 82 | 251 |
| 87 | 380 |
| 92 | 540 |
| 98 | 750 |
| 104 | 950 |
| 107 | 1130 |
| 113 | 1470 |
| 118 | 1760 |
| 121 | 2000 |

The theoretical Arrhenius equation relating current density to temperature for constant voltage cells is as follows:

$$\text{Current Density} = Ae^{-E_a/RT}$$

where A and $E_a$ (energy of activation) are experimentally observed constants. $E_a$ is expressed in KCal/mole and temperature is measured in degrees Kelvin.

Using the data of FIG. 1, the constants A and $E_a$ were calculated and found to be as follows:
$A = 5.414 \times 10^{12}$ amps/cm²

$E_a = 16.836$ KCal/mole $R^2$ (correlation coefficent) = 0.992

The foregoing analysis provides a value of $E_a$ which is remarkably similar to classical theoretical values for constant voltage systems.

The foregoing experiment was run at a NaOH concentration of 19 M. The same experiments were run utilizing an electrolyte comprising deionized water, excess solid LiOH, and NaOH at a concentration of 2.5 M or 12 M, resulting in consistent values of A and $E_a$, with a correlation coefficient $R^2$ of 0.986. This demonstrates that consistent results are obtainable regardless of the NaOH concentration as long as the electrolyte is saturated with respect to LiOH, as well as a very low variation in current density of about ±10%, which is excellent.

EXAMPLE 2

The cell of Example 1 was operated at a constant voltage of 1.00 ±0.03 volts. In systems where voltage is variable, polarization losses are frequently the major source of inefficiency and wasted heat. Polarization loss is defined as the difference between the anode open circuit voltage $V_{OC}$ (versus a reference) and the anode voltage V (versus a reference). Furthermore, polarization losses for exemplary cells of the invention were experimentally found to be governed by the following equation:

$$\text{Polarization loss} = (V_{OC} - V) = [(k)(C.D.)(e^{-E_a/RT})]$$

where k is a constant, $E_a$ is energy of activation, and C.D. (current density) is measured in amps/cm².

In order to investigate the polarization losses exhibited by an exemplary cell of the invention and to investigate what effect, if any, variations in electrolytes or temperature had on such polarization losses, a cell similar to that of Example 1 was constructed. The cathode was a 316 stainless steel strip about 1½"×8" in size, and the anode was a lithium disc, ⅜" in diameter and about 0.150" thick adhered to an anodized titanium strip coated with a rubber insulating material. Both were partially immersed in about 325 cc of an aqueous electrolyte comprising 50 wt. % NaOH and saturated with LiOH, or an aqueous electrolyte comprising 45 wt. % KOH and saturated with LiOH, both with excess solid LiOH present.

The reference was copper wire, $V_{OC}$ vs. Cu=1.3. The circuit comprised a direct current power supply, an ammeter and a voltmeter. The Pyrex ® beaker volume was 600 cc placed on a heater/stirrer with a one inch magnetic stir bar.

The cell was operated at temperatures of 23.7° C., 54.7° C., 80.5° C. and 93.1° C. At each temperature, multiple readings of voltage and current were taken, the polarization loss $V_{OC} - V$ was calculated and plotted against current density. The results are shown in FIG. 2.

From the foregoing data, the constant k was experimentally measured to be $5.1 \times 10^{-12}$ and the activation energy $E_a$ was measured to be 19.4 KCal/mole.

The data of FIG. 2 demonstrate extremely good and previously unattainable minimization of polarization losses and that, according to the invention, polarization losses are minimized in exponential relationship to increases in temperature.

Further, it is noted that the two various electrolytes were run at a total of four temperatures, with no measurable differences in results between electrolytes being observed.

EXAMPLE 3

FIG. 3 depicts a plot of current density versus electrolyte temperature for the experimental cells of the invention described above in Example 2, using polarization loss as a parameter. The plot of FIG. 3 was constructed by utilizing the experimentally measured values of k and $E_a$, and selecting desired current density and operation temperature values. Current density versus temperature was calculated for various levels of polarization loss.

FIG. 3 demonstrates that, as the electrolyte temperature of the inventive cell increases, polarization losses decrease. Therefore, polarization losses which are encountered with increases in current are compensable by corresponding increases in temperature according to the invention. This is a remarkable characteristic of the invention, and provides ready control of operating characteristics by the user depending upon the particular application.

The foregoing detailed description is given for clearness of understanding only, and no unnecessary limitations are to be understood therefrom, as modifications within the scope of the invention will be obvious to those skilled in the art.

I claim:

1. An electrochemical cell, comprising:
   (a) an anode of an anodic metal which is reactive with water; and,
   (b) a non-reactive electrically conductive cathode spaced from said anode, each of said anode and said cathode being at least partially immersed during operation in a liquid electrolyte comprising an aqueous solution of a negatively charged electrolytic ionic specie, said electrolyte being saturated at the interface region between the electrolyte and the anode with respect to the product formed between said ionic specie and said anodic metal as a result of the electrochemical reaction at said anode, said cell being adapted to operate at an elevated temperature sufficiently high to produce useful electrical current at a preselected rate.

2. The cell of claim 1 wherein said anode comprises said anodic metal in compound, alloy or amalgam form.

3. The cell of claim 1 wherein said anode comprises said anodic metal in elemental form.

4. The cell of claim 1 wherein said anodic metal comprises an alkali metal.

5. The cell of claim 4 wherein said metal is sodium.

6. The cell of claim 4 wherein said metal is lithium.

7. The cell of claim 4 wherein said metal is potassium.

8. The cell of claim 1 wherein said cathode comprises a metal.

9. The cell of claim 1 wherein said cathode is a gas diffusion cathode.

10. The cell of claim 9 wherein said cathode is an air cathode.

11. The cell of claim 1 wherein said ionic specie is selected from the group consisting of hydroxide, halide, phosphate and carbonate ions.

12. The cell of claim 1 wherein said ionic specie comprises hydroxide ions.

13. The cell of claim 12 wherein said anodic metal comprises lithium.

14. The cell of claim 1 wherein said electrolyte further comprises a dissolved salt providing said ionic specie and a cation other than the cationic form of said anodic metal.

15. The cell of claim 1 wherein saturation of said electrolyte is effected by the presence of excess solid anode reaction product.

16. The cell of claim 15 further comprising means for physically separating excess solid reaction product from said electrolyte.

17. The cell of claim 16 wherein said separating means comprises a filter.

18. The cell of claim 16 wherein said separating means comprises a centrifuge.

19. The cell of claim 1 wherein said electrolyte temperature is less than the boiling point of said electrolyte at the pressure of operation of said cell.

20. The cell of claim 19 wherein said temperature is greater than the melting point of said anodic metal.

21. The cell of claim 19 wherein said anode comprises elemental lithium and said temperature is greater than about 55° C.

22. The cell of claim 21 wherein said temperature is greater than about 90° C.

23. The cell of claim 19 further including associated heat exchange means for maintaining said electrolyte temperature at a desired level.

24. An electrochemical cell, comprising:
   (a) a lithium anode; and,
   (b) a non-reactive electrically conductive cathode spaced from said anode, each of said anode and said cathode being at least partially immersed during operation in a liquid electrolyte comprising an aqueous solution of lithium hydroxide, said electrolyte being saturated at the interface region between the electrolyte and the anode with respect to said lithium hydroxide, said cell being adapted to operate at an elevated temperature sufficiently high to produce useful electrical current at a preselected rate.

25. The cell of claim 24 wherein said anode comprises said lithium in compound, alloy or amalgam form.

26. The cell of claim 24 wherein said anode comprises said lithium in elemental form.

27. The cell of claim 24 wherein said cathode comprises a metal.

28. The cell of claim 24 wherein said cathode is a gas diffusion cathode.

29. The cell of claim 24 wherein said cathode is an air cathode.

30. The cell of claim 24 wherein said electrolyte further comprises a dissolved salt providing hydroxide ions and a metal cation other than lithium cation.

31. The cell of claim 30 wherein said electrolyte comprises dissolved sodium hydroxide or potassium hydroxide in addition to said lithium hydroxide.

32. The cell of claim 24 wherein saturation of said electrolyte is effected by the presence of excess solid lithium hydroxide.

33. The cell of claim 32 further comprising means for physically separating excess solid lithium hydroxide from said electrolyte.

34. The cell of claim 33 wherein said separating means comprises a filter.

35. The cell of claim 33 wherein said separating means comprises a centrifuge.

36. The cell of claim 24 wherein said electrolyte temperature is less than the boiling point of said electrolyte at the pressure of operation of said cell.

37. The cell of claim 36 wherein said temperature is greater than the melting point of said lithium anode.

38. The cell of claim 36 wherein said anode comprises elemental lithium and said temperature is greater than about 55° C.

39. The cell of claim 38 wherein said temperature is greater than about 90° C.

40. The cell of claim 36 further including associated heat exchange means for maintaining said electrolyte temperature at a desired level.

41. A method of generating electricity in an electrochemical cell, said method comprising the steps of:
   (a) providing an anode of an anodic metal which is reactive with water, and a cathode of a nonreactive, electrically conductive material;

(b) at least partially immersing each of said anode and said cathode in an aqueous liquid electrolyte comprising an aqueous solution of a negatively charged electrolytic ionic specie, said electrolyte being saturated with respect to the product formed between said ionic specie and said anodic metal as a result of the electrochemical reaction at said anode;

(c) maintaining said cell at an elevated temperature sufficiently high to produce a useful electrical current at a preselected rate; and (d) withdrawing electrical current from a circuit connecting said anode and said cathode.

42. The method of claim 41 wherein said anode comprises said anodic metal in compound, alloy or amalgam form.

43. The method of claim 41 wherein said anode comprises said anodic metal in elemental form.

44. The method of claim 41 wherein said anodic metal comprises an alkali metal.

45. The method of claim 44 wherein said metal is sodium.

46. The method of claim 44 wherein said metal is lithium.

47. The method of claim 44 wherein said metal is potassium.

48. The method of claim 41 wherein said cathode comprises a metal.

49. The method of claim 41 wherein said cathode is a gas diffusion cathode.

50. The method of claim 49 wherein said cathode is an air cathode.

51. The method of claim 41 wherein said ionic specie is selected from the group consisting of hydroxide, halide, phosphate and carbonate ions.

52. The method of claim 41 wherein said ionic specie comprises hydroxide ions.

53. The method of claim 52 wherein said anodic metal comprises lithium.

54. The method of claim 41 wherein said electrolyte further comprises a dissolved salt providing said ionic specie and a cation other than the cationic form of said anodic metal.

55. The method of claim 41 wherein saturation of said electrolyte is effected by the presence of excess solid anode reaction product.

56. The method of claim 55 wherein excess solid reaction product formed by said reaction is separated from said electrolyte by physical separating means.

57. The method of claim 56 wherein said separating means comprises a filter.

58. The method of claim 56 wherein said separating means comprises a centrifuge.

59. The method of claim 41 wherein said electrolyte temperature is maintained at less than the boiling point of said electrolyte at the pressure of operation of said cell.

60. The method of claim 59 wherein said temperature is greater than the melting point of said anodic metal.

61. The method of claim 59 wherein said anode comprises elemental lithium and said temperature is greater than 55° C.

62. The method of claim 61 wherein said temperature is greater than about 90° C.

63. The method of claim 59 wherein said electrolyte temperature is maintained by heat exchange means associated with said cell.

64. A method of generating electricity in an electrochemical cell, said method comprising the steps of:

(a) providing a lithium anode and a cathode of a nonreactive, electrically conductive material;

(b) at least partially immersing each of said anode and said cathode in an aqueous liquid electrolyte comprising an aqueous solution of lithium hydroxide, said electrolyte being saturated with respect to said lithium hydroxide;

(c) maintaining said cell at an elevated temperature sufficiently high to produce a useful electrical current at a preselected rate; and (d) withdrawing electrical current from a circuit connecting said anode and said cathode.

65. The method of claim 64 wherein said anode comprises said lithium in compound, alloy or amalgam form.

66. The method of claim 64 wherein said anode comprises said lithium in elemental form.

67. The method of claim 64 wherein said cathode comprises a metal.

68. The method of claim 64 wherein said cathode is a gas diffusion cathode.

69. The method of claim 68 wherein said cathode is an air cathode.

70. The method of claim 64 wherein said electrolyte further comprises a dissolved salt providing hydroxide ions and a metal cation other than lithium cation.

71. The method of claim 70 wherein said electrolyte comprises dissolved sodium hydroxide or potassium hydroxide in addition to said lithium hydroxide.

72. The method of claim 64 wherein saturation of said electrolyte is effected by the presence of excess solid lithium hydroxide.

73. The method of claim 72 wherein excess solid lithium hydroxide is separated from said electrolyte by physical separating means.

74. The method of claim 73 wherein said separating means comprises a filter.

75. The method of claim 73 wherein said separating means comprises a centrifuge.

76. The method of claim 64 wherein said electrolyte temperature is maintained at less than the boiling point of said electrolyte at the pressure of operation of said cell.

77. The method of claim 76 wherein said temperature is greater than the melting point of said anode.

78. The method of claim 76 wherein said anode comprises elemental lithium and said temperature is greater than about 55° C.

79. The method of claim 78 wherein said temperature is greater than about 90° C.

80. The method of claim 76 wherein said electrolyte temperature is maintained by heat exchange means associated with said cell.

* * * * *